(12) United States Patent
Zhang et al.

(10) Patent No.: US 11,012,892 B2
(45) Date of Patent: May 18, 2021

(54) RESOURCE OBTAINING METHOD, APPARATUS, AND SYSTEM

(71) Applicant: Huawei Technologies Co., Ltd., Shenzhen (CN)

(72) Inventors: Yaoye Zhang, Nanjing (CN); Ying Gao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 59 days.

(21) Appl. No.: 16/595,083

(22) Filed: Oct. 7, 2019

(65) Prior Publication Data
US 2020/0045588 A1 Feb. 6, 2020

Related U.S. Application Data

(63) Continuation of application No. PCT/CN2018/080763, filed on Mar. 28, 2018.

(30) Foreign Application Priority Data

Apr. 7, 2017 (CN) .......................... 201710225277.8

(51) Int. Cl.
*H04W 28/26* (2009.01)
*H04W 72/04* (2009.01)
(52) U.S. Cl.
CPC ....... *H04W 28/26* (2013.01); *H04W 72/0426* (2013.01)
(58) Field of Classification Search
None
See application file for complete search history.

(56) References Cited

U.S. PATENT DOCUMENTS

| 10,009,813 | B2* | 6/2018 | Sirotkin | ................ H04L 1/0026 |
| 2013/0172043 | A1* | 7/2013 | Garg | ..................... H04W 24/02 455/524 |
| 2014/0092730 | A1* | 4/2014 | Yang | ................ H04W 28/0226 370/229 |
| 2014/0185606 | A1 | 7/2014 | Wei | |
| 2014/0280679 | A1* | 9/2014 | Dey | ....................... H04L 65/80 709/213 |
| 2015/0142914 | A1 | 5/2015 | Lau et al. | |

(Continued)

FOREIGN PATENT DOCUMENTS

| CN | 101345690 A | 1/2009 |
| CN | 101557499 A | 10/2009 |

(Continued)

*Primary Examiner* — Otis L Thompson, Jr.
(74) *Attorney, Agent, or Firm* — Conley Rose, P.C.

(57) ABSTRACT

A resource obtaining method, apparatus, and system, wherein the method includes: when a first edge node receives a first resource obtaining request sent by a second edge node, and a first target resource is not locally cached, the first edge node may determine, using shared popularity information of the first target resource, whether the first target resource needs to be cached. The shared popularity information of the first target resource is determined by a quantity of obtaining requests for the first target resource that are received by the first edge node from the first edge node and another edge node. Therefore, it is determined, using the shared popularity information, whether the first target resource needs to be cached.

18 Claims, 10 Drawing Sheets

(56) References Cited

U.S. PATENT DOCUMENTS

2016/0135072 A1* 5/2016 Wang .................... H04W 28/06
                                                    370/237
2017/0064029 A1* 3/2017 Das ........................ H04W 4/18

FOREIGN PATENT DOCUMENTS

| CN | 101883012 A | 11/2010 |
| CN | 103312776 A | 9/2013 |
| EP | 3016356 A1 | 5/2016 |

* cited by examiner

RESOURCE OBTAINING METHOD, APPARATUS, AND SYSTEM

CROSS-REFERENCE TO RELATED APPLICATIONS

This application is a continuation of International Patent Application No. PCT/CN2018/080763, filed on Mar. 28, 2018, which claims priority to Chinese Patent Application No. 201710225277.8, filed on Apr. 7, 2017. The disclosures of the aforementioned applications are hereby incorporated by reference in their entireties.

TECHNICAL FIELD

This application relates to the wireless communications field, and in particular, to a resource obtaining method, apparatus, and system.

BACKGROUND

With development of wireless communications technologies, a terminal increasingly needs to obtain a resource using a mobile communications network. The mobile communications network mainly includes two parts: a radio access network and a core network. The radio access network mainly includes at least one base station, and the core network mainly includes a gateway device. A Long-Term Evolution (LTE) network architecture is used as an example, the at least one base station may communicate with the gateway device using an S1 interface, and any two base stations in the at least one base station may communicate with each other using an X2 interface. When the terminal is to obtain a resource using the mobile communications network, the terminal needs to send a resource obtaining request to a base station that covers an area in which the terminal is located, such that the base station forwards the resource obtaining request to the gateway device using the S1 interface. After receiving the resource obtaining request, the gateway device may forward the resource obtaining request to a source site of the to-be-obtained resource, to obtain the resource from the source site.

Each time the base station receives a resource obtaining request, the base station needs to forward the resource obtaining request to the gateway device. Consequently, bandwidth consumption of the S1 interface is caused. In addition, when the terminal is to obtain a resource from a source site, a round trip time (RTT) for transmitting a resource obtaining request to the source site and waiting for the source site to respond to the resource obtaining request is relatively long. Therefore, to shorten the RTT for message transmission and reduce bandwidth consumption of the S1 interface when the terminal obtains the resource, referring to FIG. 1A, an edge node may be usually deployed for each base station in a bypass or series manner, and a central node is deployed for the gateway device in a bypass or series manner. When being to obtain a resource, the terminal may send a resource obtaining request to an edge node deployed on the base station that covers the area in which the terminal is located. The resource obtaining request carries an identifier of the requested resource. When receiving the resource obtaining request, the edge node may search a local cache for a resource corresponding to the identifier. If the resource corresponding to the identifier exists in the local cache of the edge node, the edge node may send the resource to the terminal. If the resource corresponding to the identifier does not exist in the local cache of the edge node, the edge node may request the central node or the source site to obtain the resource corresponding to the identifier, and increase popularity information such as a quantity of requests for the resource corresponding to the identifier. If increased popularity information of the resource corresponding to the identifier meets a preset cache condition, for example, a quantity of requests for the resource corresponding to the identifier is greater than a preset quantity threshold, after the edge node obtains the resource from the central node or the source site, the edge node can not only send the obtained resource to the terminal, but also store the obtained resource in the local cache.

According to the foregoing method, each edge node collects statistics about popularity information for requesting a same resource, and locally caches the resource only when the popularity information of the resource meets the preset cache condition. Therefore, although the popularity information for requesting the same resource that is sent to the central node or the source site using the gateway device meets the preset cache condition, for a specific edge node, the popularity information of the same resource that is obtained through statistics collection may not meet the preset cache condition. In this case, the edge node does not locally cache the resource. Therefore, when the terminal sends a resource obtaining request to the edge node, the edge node still needs to continuously obtain the resource from the central node or the source site using the S1 interface. Consequently, bandwidth consumption of the S1 interface is not reduced.

SUMMARY

To reduce bandwidth consumption of an interface between a base station and a gateway device, and accelerate a speed of caching a resource by an edge node, this application provides a resource obtaining method, apparatus, and system. The technical solutions are as follows.

According to a first aspect, a resource obtaining method is provided, where the method is applied to a case in which a first base station and a second base station access an external network using a same gateway device, a first edge node is deployed on the first base station, a second edge node is deployed on the second base station, and the method includes: receiving, by the first edge node, a first resource obtaining request sent by the second edge node, where the first resource obtaining request carries a resource identifier of a first target resource; determining, by the first edge node, that a first target resource corresponding to the resource identifier of the first target resource is not locally cached; determining, by the first edge node based on shared popularity information of the first target resource, whether the first target resource needs to be cached, where the shared popularity information of the first target resource is determined by a quantity of obtaining requests for the first target resource that are received by the first edge node from the first edge node and another edge node, and the other edge node includes any edge node other than the first edge node deployed on a base station that accesses an external network using the gateway device; when the first target resource needs to be cached, obtaining the first target resource from a central node deployed on the gateway device or a source site of the first target resource; caching the first target resource; and sending the first target resource to the second edge node.

In addition, a resource identifier is used to uniquely identify a resource, and the resource identifier may be an address of the resource, a name of the resource, or the like.

It should be noted that the second edge node may be any edge node other than the first edge node deployed on the base station that accesses the external network using the gateway device. In addition, the external network is relative to a location of the gateway device, and all base stations connected to the gateway device and all terminals connected to these base stations constitute an internal network. Any base station or any terminal in the internal network needs to communicate with a device in the external network using the gateway device.

The shared popularity information of the first target resource and the resource identifier of the first target resource may be stored in a form of a correspondence, or may be stored in a form of a cache queue. Certainly, in actual application, the shared popularity information of the first target resource may alternatively be stored in another form.

In addition, the shared popularity information of the first target resource may be determined by a quantity of obtaining requests for the first target resource that are received by the first edge node from an edge node (including the first edge node) deployed on the base station that accesses the external network using the gateway device. When the quantity of obtaining requests is greater than a preset quantity threshold, it is determined that the first target resource needs to be cached. When the quantity of obtaining requests is less than or equal to the preset quantity threshold, it is determined that the first target resource does not need to be cached. The shared popularity information of the first target resource may alternatively be determined within a preset time period by a quantity of obtaining requests for the first target resource that are received by the first edge node from an edge node (including the first edge node) deployed on the base station that accesses the external network using the gateway device, for example, a quantity of obtaining requests within T days before a current time. When the quantity of obtaining requests is greater than a preset quantity threshold, it is determined that the first target resource needs to be cached. When the quantity of obtaining requests is less than or equal to the preset quantity threshold, it is determined that the first target resource does not need to be cached.

In this embodiment of the present disclosure, when the first edge node receives the first resource obtaining request sent by the second edge node, and the first target resource is not locally cached, the first edge node may determine, using the shared popularity information of the first target resource, whether the first target resource needs to be cached. The shared popularity information of the first target resource is determined by the quantity of obtaining requests for the first target resource that are received by the first edge node from the first edge node and the other edge node, in other words, the first edge node may collect statistics about a request for obtaining the first target resource that is sent by any edge node. Therefore, popularity of the first target resource in the first edge node is improved. It is determined, using the shared popularity information, whether the first target resource needs to be cached, to accelerate a speed of caching the first target resource by the first edge node.

In a possible implementation, after the determining, based on shared popularity information of the first target resource, whether the first target resource needs to be cached, the method further includes: when the first target resource does not need to be cached, sending first prompt information to the second edge node, where the first prompt information is used to prompt the second edge node to obtain the first target resource from the central node or the source site of the first target resource.

When the first edge node does not need to cache the first target resource requested by the second edge node, the second edge node obtains the first target resource from the central node or the source site of the first target resource, to avoid a delay increase caused by a case in which the first edge node obtains the first target resource from the central node or the source site of the first target resource, and then forwards the first target resource to the second edge node.

In a possible implementation, after the receiving a first resource obtaining request sent by the second edge node, the method further includes updating the shared popularity information of the first target resource.

It should be noted that the first edge node is configured to share the first target resource with other edge nodes, and when any one of the other edge nodes (any edge node other than the first edge node deployed on the base station that accesses the external network using the gateway device) does not locally obtain the first target resource, the edge node may send the first resource obtaining request about the first target resource to the first edge node. Therefore, to accelerate a speed of caching the first target resource by the first edge node from the central node or the source site of the first target resource, after receiving the first resource obtaining request sent by the second edge node, the first edge node may further update the shared popularity information of the first target resource. For example, each time an obtaining request is received, popularity corresponding to the resource is increased by 1.

In a possible implementation, the method further includes: receiving, by the first edge node, a second resource obtaining request sent by a terminal, where the second resource obtaining request carries a resource identifier of a second target resource; determining that a second target resource corresponding to the resource identifier of the second target resource is not locally cached; determining a node identifier of a third edge node based on the resource identifier of the second target resource and a stored hash table, where the hash table includes a mapping relationship between a node identifier of an edge node deployed on the base station that accesses the external network using the gateway device and a corresponding hash value; and sending the second resource obtaining request to a third edge node corresponding to the node identifier of the third edge node.

It should be noted that a node identifier is used to uniquely identify a corresponding edge node, and the node identifier may be an Internet Protocol (IP) address, a media access control (MAC) address, or the like of the edge node.

In this embodiment of the present disclosure, when the first edge node receives the second resource obtaining request sent by the terminal, if the first edge node does not cache the second target resource, the first edge node may determine the node identifier of the third edge node based on the resource identifier of the second target resource and the stored hash table, and send the second resource obtaining request to the third edge node, to obtain the second target resource from the third edge node. Therefore, the first edge node does not need to send the second resource obtaining request to the central node or a source site of the second target resource, to reducing bandwidth consumption of an interface between the base station and the gateway device.

In a possible implementation, the determining a node identifier of a third edge node based on the resource identifier of the second target resource and a stored hash table includes: performing a hash operation on the resource identifier of the second target resource, to obtain a first hash value; determining, in hash values of node identifiers of edge nodes deployed on the base station that accesses the external network using the gateway device, a second hash value having a shortest logical distance from the first hash value; obtaining, from the hash table, a node identifier corresponding to the second hash value; and determining the obtained node identifier as the node identifier of the third edge node.

Because the hash values of the node identifiers of the edge nodes deployed on the base station that accesses the external network using the gateway device may constitute a hash ring, the shortest logical distance is a shortest distance in a clockwise direction of the hash ring or a shortest distance in a counterclockwise direction of the hash ring.

For example, in a possible implementation, when determining, in the hash values of the node identifiers of the edge nodes deployed on the base station that accesses the external network using the gateway device, the second hash value having a shortest logical distance from the first hash value, the first edge node may first determine a location of the first hash value in the hash ring, and then determine, using the location of the first hash value in the hash ring as a start point, that a hash value adjacent to the first hash value in a clockwise direction of the hash ring is a hash value having a shortest logical distance from the first hash value.

A hash operation is performed, such that a same edge node can be used as a shared processing node corresponding to resources corresponding to a same resource identifier. In this way, both consistency and load balancing are ensured, and performance pressure caused by a case in which a specific edge node is used as a shared processing node corresponding to all resources is avoided.

In a possible implementation, before the determining a node identifier of a third edge node based on the resource identifier of the second target resource and a stored hash table, the method further includes receiving the hash table delivered by a deployment central node.

In this embodiment of the present disclosure, the hash table includes the mapping relationship between a node identifier of an edge node and a corresponding hash value. Therefore, the gateway device can learn of, in real time, any base station that is newly connected to the gateway and any base station that is disconnected from the gateway. Therefore, the central node on the gateway generates the hash table, such that the hash table can be updated in time.

In a possible implementation, after the sending second resource obtaining request to a third edge node corresponding to the node identifier of the third edge node, the method further includes: when receiving second prompt information sent by the third edge node, sending the second resource obtaining request to the central node or a source site of the second target resource, where the second prompt information is used to prompt the first edge node to obtain the second target resource from the central node or the source site of the second target resource; and receiving the second target resource sent by the central node or the source site of the second target resource, and sending the second target resource to the terminal.

It should be noted that the second prompt information is used to prompt the first edge node to obtain the second target resource from the central node or the source site of the second target resource. Therefore, when the first edge node does not obtain the second target resource from the third edge node, the first edge node may still obtain the second target resource from the central node or the source site of the second target resource, to ensure that a terminal that is in a network coverage area of the first edge node and that requests to obtain the second target resource can obtain the second target resource, thereby improving reliability of obtaining the second target resource by the terminal.

According to a second aspect, a resource obtaining method is provided, where the method is applied to a case in which a first base station and a second base station access an external network using a same gateway device, a first edge node is deployed on the first base station, a second edge node is deployed on the second base station, and the method includes: receiving, by the second edge node, a first resource obtaining request sent by a terminal, where the first resource obtaining request carries a resource identifier of a first target resource; determining, by the second edge node, that the first target resource is not locally cached, determining a node identifier of the first edge node based on the resource identifier of the first target resource and a stored hash table, and sending the first resource obtaining request to a first edge node corresponding to the node identifier of the first edge node, where the hash table includes a mapping relationship between a node identifier of an edge node deployed on a base station that accesses an external network using the gateway device and a corresponding hash value; receiving, by the first edge node, the first resource obtaining request, and determining that a first target resource corresponding to the resource identifier of the first target resource is not locally cached; determining, by the first edge node based on shared popularity information of the first target resource, whether the first target resource needs to be cached, where the shared popularity information of the first target resource is determined by a quantity of obtaining requests for the first target resource that are received by the first edge node from the first edge node and another edge node, and the other edge node includes any edge node other than the first edge node deployed on the base station that accesses the external network using the gateway device; when the first target resource needs to be cached, sending, by the first edge node, the first resource obtaining request to a central node deployed on the gateway device or a source site of the first target resource; receiving, by the central node or the source site of the first target resource, the first resource obtaining request; obtaining the first target resource corresponding to the resource identifier of the first target resource; sending the first target resource to the first edge node; receiving, by the first edge node, the first target resource sent by the central node or the source site of the first target resource; caching the first target resource sending the first target resource to the second edge node; receiving, by the second edge node, the first target resource sent by the first edge node; and sending the first target resource to the terminal.

In a possible implementation, before the determining a node identifier of the first edge node based on the resource identifier of the first target resource and a stored hash table, the method further includes: performing, by the central node, a hash operation on node identifiers of a plurality of edge nodes, to obtain a hash value of a node identifier of each edge node; and establishing, by the central node, a mapping relationship between a node identifier of an edge node deployed on the base station that accesses the external network using the gateway device and a corresponding hash value, to obtain the hash table, and sending the hash table to an edge node deployed on the base station that accesses the external network using the gateway device.

It should be noted that the central node may perform, using any hash algorithm, a hash operation on the node identifiers of the edge nodes deployed on the base station that accesses the external network using the gateway device, and the hash algorithm may be murmur, CRC32, Adler32, or the like. Certainly, in actual application, to evenly allocate resources in the central node or a source site to the edge nodes for processing as much as possible, a most appropriate hash algorithm may be usually selected based on characteristics of the resources. Alternatively, sequence numbers are added to the node identifiers of the edge nodes, and a hash operation is performed on the node identifiers with the sequence numbers, to obtain the plurality of hash values corresponding to the node identifiers.

In this embodiment of the present disclosure, the central node preprocesses the node identifiers of the plurality of edge nodes (the edge nodes deployed on the base station that accesses the external network using the gateway device), to obtain the hash table. Because the hash table includes the mapping relationship between each of the node identifiers of the plurality of edge nodes and each of the corresponding hash values, the edge node may subsequently obtain, based on the hash table, a shared resource from another edge node that can share a resource, and does not need to obtain, using the gateway device, a resource from the central node or a source site of the resource each time the edge node needs to obtain the resource, to reduce bandwidth consumption of an interface between the base station and the gateway device.

According to a third aspect, a resource obtaining apparatus is provided, where the resource obtaining apparatus has a function of implementing behavior in the resource obtaining method in the first aspect. The resource obtaining apparatus includes at least one module, and the at least one module is configured to implement the resource obtaining method provided in the first aspect.

According to a fourth aspect, a resource obtaining system is provided, where the resource obtaining system has a function of implementing behavior in the resource obtaining method in the second aspect. The resource obtaining system includes at least one apparatus, and the at least one apparatus is configured to implement the resource obtaining method provided in the second aspect.

According to a fifth aspect, a resource obtaining apparatus is provided, where a structure of the resource obtaining apparatus includes a processor and a memory, and the memory is configured to store a program that supports the resource obtaining apparatus in performing the resource obtaining method provided in the first aspect, and store data used to implement the resource obtaining method provided in the first aspect. The processor is configured to execute the program stored in the memory. An resource obtaining apparatus may further include a communications bus, and the communications bus is configured to establish a connection between the processor and the memory.

According to a sixth aspect, a computer readable storage medium is provided, where the computer readable storage medium stores an instruction, and when the instruction is run on a computer, the computer is enabled to perform the resource obtaining method in the first aspect.

According to a seventh aspect, a computer program product including an instruction is provided, where when the computer program product is run on a computer, the computer is enabled to perform the resource obtaining method in the first aspect.

Technical effects achieved in the second aspect, the third aspect, the fourth aspect, the fifth aspect, the sixth aspect, and the seventh aspect are similar to technical effects achieved using corresponding technical means in the first aspect. Details are not described herein again.

Beneficial effects brought by the technical solutions provided in this application are as follows. In the embodiments of the present disclosure, when the first edge node receives the first resource obtaining request sent by the second edge node, and the first target resource is not locally cached, the first edge node may determine, using the shared popularity information of the first target resource, whether the first target resource needs to be cached. Because the shared popularity information of the first target resource is determined by the quantity of obtaining requests for the first target resource that are received by the first edge node from the first edge node and the other edge node, popularity of the first target resource in the first edge node is improved. It is determined, using the shared popularity information, whether the first target resource needs to be cached, to accelerate a speed of caching the first target resource by the first edge node. In addition, the second edge node may obtain the first target resource from the first edge node, and the second edge node does not need to send the first resource obtaining request to the central node or the source site of the first target resource using the gateway device. Therefore, bandwidth consumption of an interface between the base station and the gateway device is reduced.

DESCRIPTION OF EMBODIMENTS

To make the objectives, technical solutions, and advantages of this application clearer, the following further describes the implementations of this application in detail with reference to the accompanying drawings.

Figure 1A:
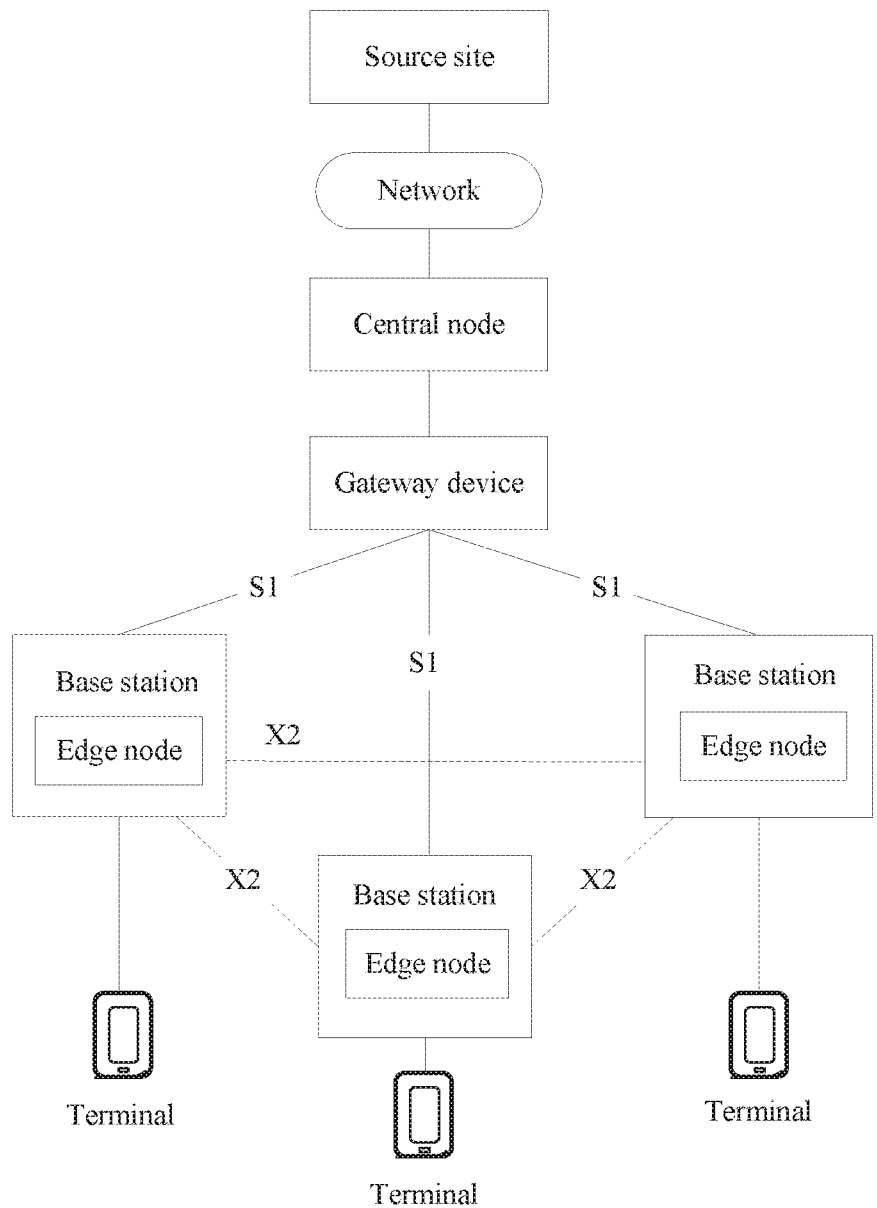
FIG. 1A is a schematic diagram of a deployment architecture of an edge node according to an embodiment of the present disclosure.
Figure 1B:
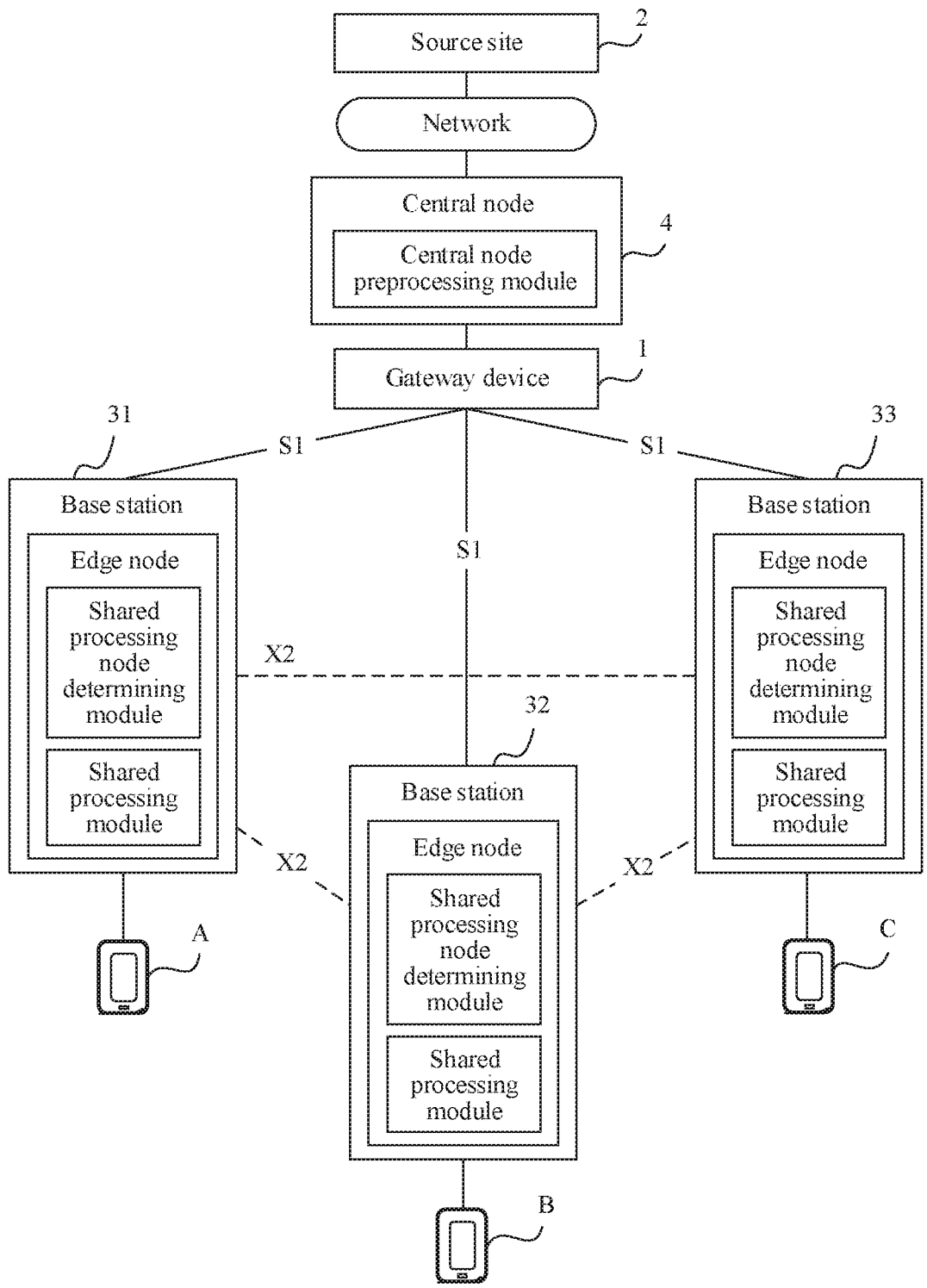
FIG. 1B is a schematic architectural diagram of a resource obtaining system according to an embodiment of the present disclosure.

Before the embodiments of the present disclosure are described in detail, a system architecture of the embodiments of the present disclosure is first described. FIG. 1B is a schematic architectural diagram of a resource obtaining system according to an embodiment of the present disclosure. Referring to FIG. 1B, the system architecture includes a gateway device 1, a source site 2, and a plurality of base stations that access an external network using the gateway device 1. Each of the plurality of base stations provides an access service for a plurality of terminals in a coverage area of the base station, and the plurality of base stations may communicate with each other. For example, an LTE network architecture is used as an example, and any two base stations in the plurality of base stations may communicate with each other using an X2 interface. In addition, each of the plurality of base stations may further communicate with the gateway device 1. The LTE network architecture is still used as an example, and each base station may communicate with the gateway device using an S1 interface.

A quantity of base stations in a same gateway device and a quantity of terminals in a coverage area of each base station are not limited in this embodiment of the present disclosure. For ease of description, an example in which there are three base stations and each base station covers one terminal is used for description in the accompanying drawing in this embodiment of the present disclosure. Referring to FIG. 1B, the three base stations are respectively a base station 31, a base station 32, and a base station 33, where the base station 31 corresponds to a terminal A, the base station 32 corresponds to a terminal B, and the base station 33 corresponds to a terminal C.

In addition, in a related technology, when a terminal obtains a resource, a transmission delay during message transmission such as an RTT and bandwidth consumption of an S1 interface are increased. Therefore, to shorten an RTT for message transmission and reduce bandwidth consumption of an S1 interface when the terminal requests a resource, an edge node is deployed on each of the plurality of base stations, and the edge node may be deployed on the base station in a bypass or series manner, or the edge node may be a function module in the base station. A deployment manner of the edge node is not limited in this embodiment of the present disclosure. In addition, a central node is deployed on the gateway device 1. Similarly, the central node may be deployed on the gateway device 1 in a bypass or series manner, or may be a function module in the gateway device 1. It should be noted that a source site in a network is configured to store resource content and provide a resource downloading service for an edge node or a central node in the network. There may be a plurality of source sites in the network, and different resources may be corresponding to different source sites. A quantity of source sites is not limited in this embodiment of the present disclosure.

Each edge node may include a shared processing node determining module and a shared processing module, and the central node 4 may include a central node preprocessing module.

The central node preprocessing module may perform a hash operation on node identifiers of the plurality of edge nodes, to obtain hash values corresponding to the node identifiers of the plurality of edge nodes, establish a mapping relationship between each of the node identifiers of the plurality of edge nodes and each of the corresponding hash values, to constitute a hash table, and send the hash table to the plurality of edge nodes, such that the plurality of edge nodes store the hash table.

The shared processing module may process a resource obtaining request sent by a terminal or another edge node. For example, when receiving a resource obtaining request sent by the terminal, the shared processing module updates popularity information of a resource requested by the terminal. Alternatively, when receiving a resource obtaining request sent by the other edge node, the shared processing module updates shared popularity information of a resource requested by the other edge node, and the like. In addition, when determining, based on shared popularity information for requesting to obtain a target resource, that the target resource meets a cache condition, the shared processing module may further obtain the target resource from the central node or a source site of the target resource, and cache the obtained target resource. The target resource may be any resource.

When determining that the target resource is not locally cached, the shared processing node determining module may perform a hash operation on a resource identifier of the target resource, to obtain a hash value of the resource identifier, and determine, using the hash value of the resource identifier and the hash table sent by the central node, a shared processing node identifier corresponding to the resource identifier. Then, the edge node may forward the resource obtaining request to a determined shared processing node, to obtain a resource corresponding to the resource identifier.

Any one of the plurality of edge nodes may process, using the shared processing module, a resource obtaining request sent by another edge node, in other words, the edge node may receive a request for obtaining the target resource that is sent by the other edge node, and the shared processing module may update shared popularity information of the resource requested by the other edge node. Therefore, popularity of the target resource in the edge node is improved. In addition, the shared processing module may further determine, using the shared popularity information, whether the target resource needs to be cached, to accelerate a speed of caching the target resource by the edge node. Moreover, the shared processing node determining module included in the edge node may determine, using the hash value of the resource identifier and the hash table sent by the central node, the shared processing node identifier corresponding to the resource identifier, obtain, from an edge node corresponding to the shared processing node identifier, the resource corresponding to the resource identifier, and does not need to obtain, using the gateway device, a resource from the central node or a source site of the resource each time the edge node needs to obtain the resource, to reduce bandwidth consumption of an interface between the base station and the gateway device.

Figure 2:
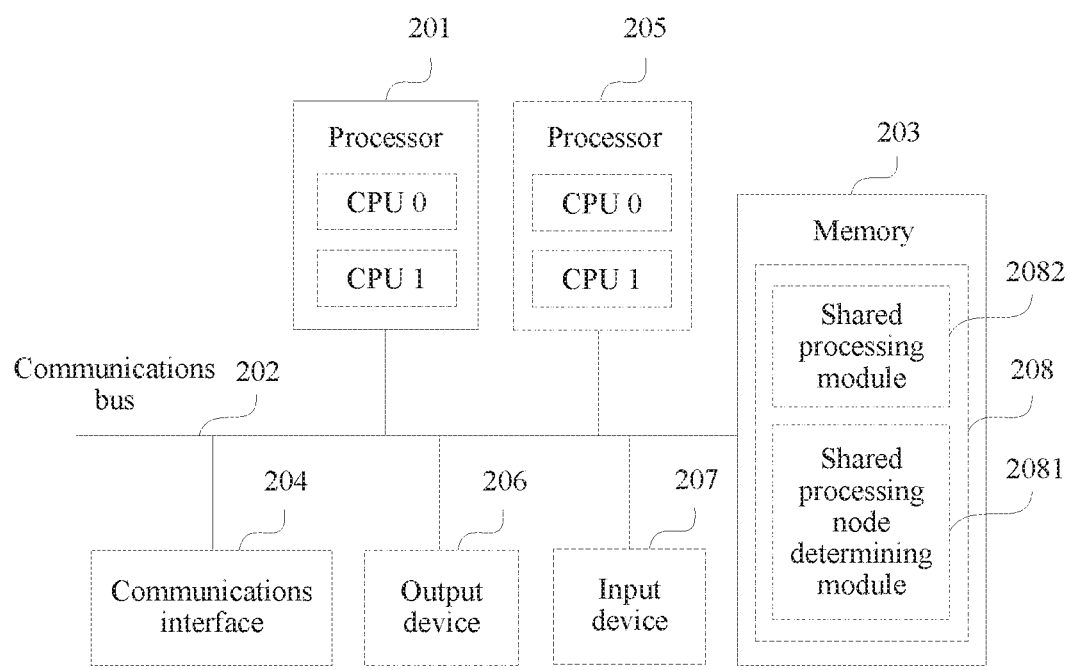
FIG. 2 is a schematic structural diagram of a network device according to an embodiment of the present disclosure.

FIG. 2 is a schematic structural diagram of a network device according to an embodiment of the present disclosure. The resource obtaining system in FIG. 1B may be implemented using the network device shown in FIG. 2. Referring to FIG. 2, the network device includes at least one processor 201, a communications bus 202, a memory 203, and at least one communications interface 204.

The processor 201 may be a general-purpose central processing unit (CPU), a microprocessor, an application-specific integrated circuit (ASIC), or one or more integrated circuits configured to control program execution in the solutions of this application.

The communications bus 202 may include a path, to transmit information between the foregoing components.

The memory 203 may be a read-only memory (ROM) or a static storage device of another type that can store static information and instructions, or a random access memory (RAM) or a dynamic storage device of another type that can store information and instructions, or may be an electrically erasable programmable read only memory (EEPROM), a compact disc (CD) read-only memory (CD-ROM) or other compact disk storage, optical disc storage (including a compact disc, a laser disc, an optical disc, a digital versatile disc, a Blu-ray disc, and the like), a magnetic disk storage medium or another magnetic storage device, or any other medium that can be configured to carry or store expected program code in a form of an instruction or a data structure and that can be accessed by a computer. However, the memory 203 is not limited thereto. The memory 203 may exist independently, and is connected to the processor 201 using the communications bus 202. Alternatively, the memory 203 may be integrated with the processor 201.

The communications interface 204 is any apparatus such as a transceiver, and is configured to communicate with another device or a communications network such as the Ethernet, a radio access network (RAN), or a wireless local area network (WLAN). For example, when the communications interface is a communications interface of an edge node, the communications interface may receive a resource obtaining request sent by a terminal and another edge node, and the communications interface may further send a stored resource and the like to the other edge node or the terminal.

During implementation, in an embodiment, the processor 201 may include one or more CPUs, for example, a CPU 0 and a CPU 1 shown in FIG. 2.

During implementation, in an embodiment, the network device may include a plurality of processors, for example, a processor 201 and a processor 205 shown in FIG. 2. Each of these processors may be a single-core (single-CPU) processor, or may be a multi-core (multi-CPU) processor. The processor herein may be one or more devices, circuits, and/or processing cores configured to process data (for example, a computer program instruction). For example, when the processor 201 is a processor of an edge node, the processor may process a resource obtaining request sent by a terminal or another edge node.

During implementation, in an embodiment, the network device may further include an output device 206 and an input device 207. The output device 206 communicates with the processor 201, and may display information in a plurality of manners. For example, the output device 206 may be a liquid crystal display (LCD), a light emitting diode (LED) display device, a cathode ray tube (CRT) display device, or a projector. The input device 207 communicates with the processor 201, and may receive a user input in a plurality of manners. For example, the input device 207 may be a mouse, a keyboard, a touchscreen device, or a sensing device.

The network device may be a general-purpose network device or a dedicated network device. During implementation, the network device may be a desktop computer, a portable computer, a network server, a personal digital assistant (PDA), a mobile phone, a tablet computer, a wireless terminal device, a communications device, or an embedded device. A type of the network device is not limited in this embodiment of the present disclosure.

The memory 203 is configured to store program code 208 for executing the solutions of this application, and the processor 201 controls the execution. The processor 201 is configured to execute the program code 208 stored in the memory 203. The program code 208 may include one or more software modules (for example, when the memory 203 is a memory of an edge node, the software module included in the program code 208 may be a shared processing node determining module 2081 or a shared processing module 2082). The processor 201 is configured to execute application program code stored in the memory 203, to implement a logical function of the edge node in FIG. 1B. The shared processing node determining module 2081 is configured such that when determining that a target resource is not locally cached, the shared processing node determining module 2081 obtains a resource identifier of the target resource using a resource obtaining request, determines identifiers of edge nodes that share the target resource (namely, an identifier of a shared processing node corresponding to the target resource), and obtains the target resource from an edge node corresponding to the determined identifier of the edge node. The shared processing module 2082 is configured to: update popularity information of a target resource requested by a terminal or update shared popularity information of a target resource requested by another edge node; and when the popularity information or the shared popularity information of the target resource meets a cache condition, cache the target resource.

It can be learned from the foregoing description that a hash table stored in an edge node is obtained by a central node by establishing a mapping relationship between each of node identifiers of a plurality of edge nodes and each of corresponding hash values. An operation of determining a hash table and sending the hash table to each edge node by the central node is described below with reference to FIG. 3. The operation includes the following steps.

Step 301: The central node performs a hash operation on node identifiers of the plurality of edge nodes, to obtain a hash value corresponding to a node identifier of each edge node.

It should be noted that the plurality of edge nodes include edge nodes deployed on a base station that accesses an external network using the gateway device. A node identifier is used to uniquely identify a corresponding edge node, and the node identifier may be an IP address, a MAC address, or the like of the edge node.

Before the system shown in FIG. 1B goes online, or when a quantity of base stations that access an external network using a same gateway device changes, the central node may perform a hash operation on the node identifiers of the plurality of edge nodes that access the external network using the gateway device, to obtain the hash value of the node identifier of each edge node.

For example, the central node performs a hash operation on each of node identifiers "192.168.1.2", "192.168.1.10", and "192.168.1.46", to obtain a hash value of "192.168.1.2": "Jkdsaf832e2qfdwq", a hash value of "192.168.1.10": "023kjdsf8232kdjs", and a hash value of "192.168.1.46": "Uh932dkawf32ndsa".

It should be noted that the central node may perform a hash operation on the node identifiers of the plurality of edge nodes using any hash algorithm, and the hash algorithm may be murmur, CRC32, Adler32, or the like. Certainly, in actual application, to evenly allocate resources in the central node or a source site to the edge nodes for processing as much as possible, a most appropriate hash algorithm may be usually selected based on characteristics of the resources. Alternatively, sequence numbers are added to the node identifiers of the edge nodes, and a hash operation is performed on the node identifiers with the sequence numbers, to obtain the plurality of hash values corresponding to the node identifiers.

For details about selecting the most appropriate hash algorithm based on the characteristics of the resources by the central node, refer to a related technology. Details are not described in this embodiment of the present disclosure.

Step 302: The central node establishes a mapping relationship between each of the node identifiers of the plurality of edge nodes and each of the corresponding hash values, to obtain a hash table.

For example, when the central node obtains the hash value of "192.168.1.2": "Jkdsaf832e2qfdwq", the hash value of "192.168.1.10": "023kjdsf8232kdjs", and the hash value of "192.168.1.46": "Uh932dkawf32ndsa", the mapping relationship that is between each node identifier and a corresponding hash value and that is established by the central node may be shown in Table 1.

TABLE 1

| Node identifier | Hash value |
|---|---|
| 192.168.1.2 | Jkdsaf832e2qfdwq |
| 192.168.1.10 | 023kjdsf8232kdjs |
| 192.168.1.46 | Uh932dkawf32ndsa |
| ... | ... |

It should be noted that in this embodiment of the present disclosure, the hash table shown in Table 1 is merely used as an example for description, and does not constitute a specific limitation on this embodiment of the present disclosure.

Step 303: The central node sends the hash table to the plurality of edge nodes.

Step 304: Each of the plurality of edge nodes receives and stores the hash table sent by the central node.

Before the system shown in FIG. 1B goes online, or when a quantity of base stations that access an external network using a same gateway device changes, the central node may perform a hash operation on the node identifiers of the plurality of edge nodes, to establish the hash table, in other words, the hash table received by the plurality of edge nodes may be determined by the central node when the quantity of base stations changes. Therefore, before this, any one of the plurality of edge nodes possibly has stored the hash table sent by the central node. Therefore, when any one of the plurality of edge nodes receives the hash table sent by the central node again, the edge node may replace the previously stored hash table with the currently received hash table.

Figure 3:
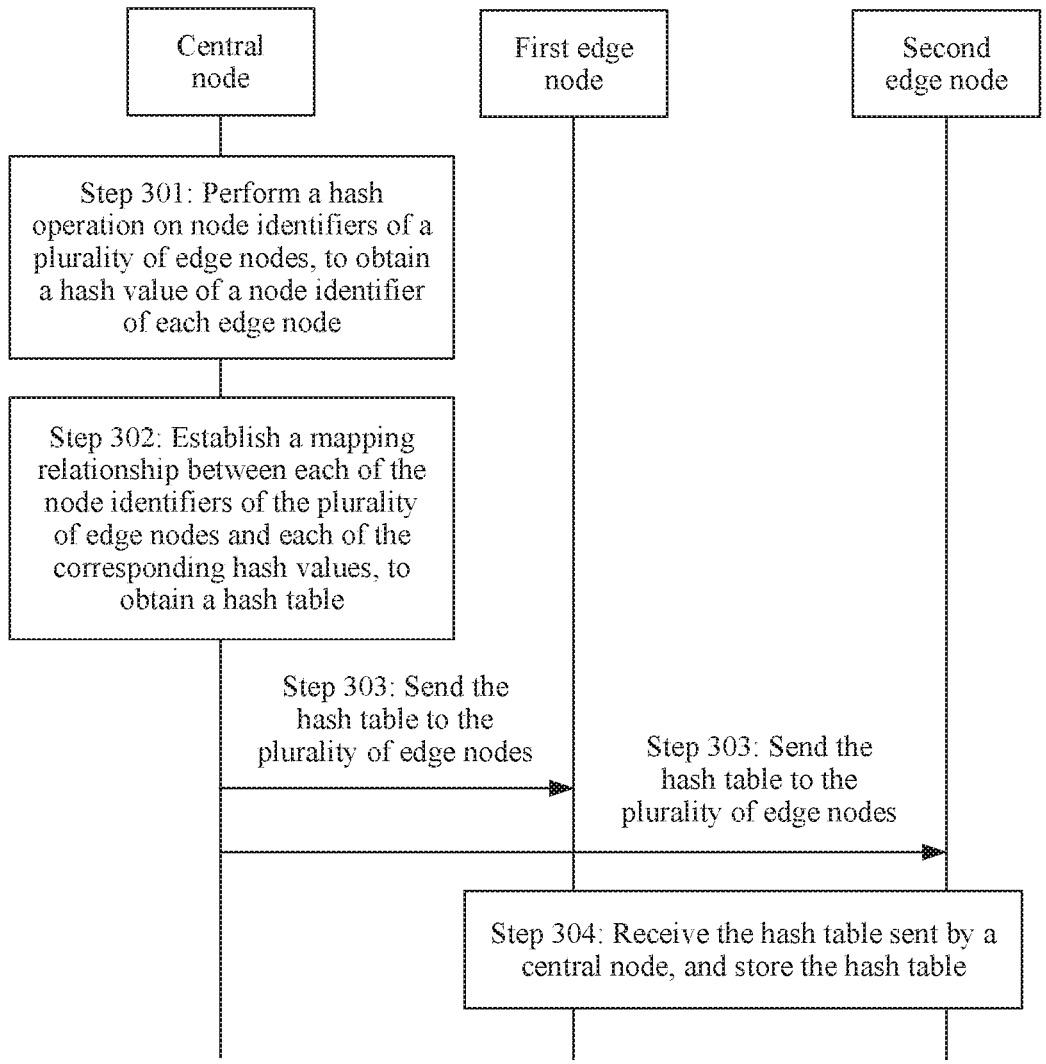
FIG. 3 is a flowchart of a method for determining a hash table by a central node according to an embodiment of the present disclosure.

In addition, an example in which a first edge node and a second edge node are used as the plurality of edge nodes is merely used for description in FIG. 3, and does not constitute a limitation on this embodiment of the present disclosure.

It should be noted that, because each of the plurality of edge nodes may receive the hash table, any one of the plurality of edge nodes can not only share a resource with another edge node, but also obtain a resource shared by the other edge node from the other edge node.

In this embodiment of the present disclosure, the central node preprocesses the node identifier of the plurality of edge nodes, to obtain the hash table. Because the hash table includes the mapping relationship between each of the node identifiers of the plurality of edge nodes and each of the corresponding hash values, the edge node may subsequently obtain, based on the hash table, a shared resource from another edge node that can share a resource, and does not need to obtain, using the gateway device, a resource from the central node or a source site of the resource each time the edge node needs to obtain the resource, to reduce bandwidth consumption of an interface between the base station and the gateway device.

Figure 4:
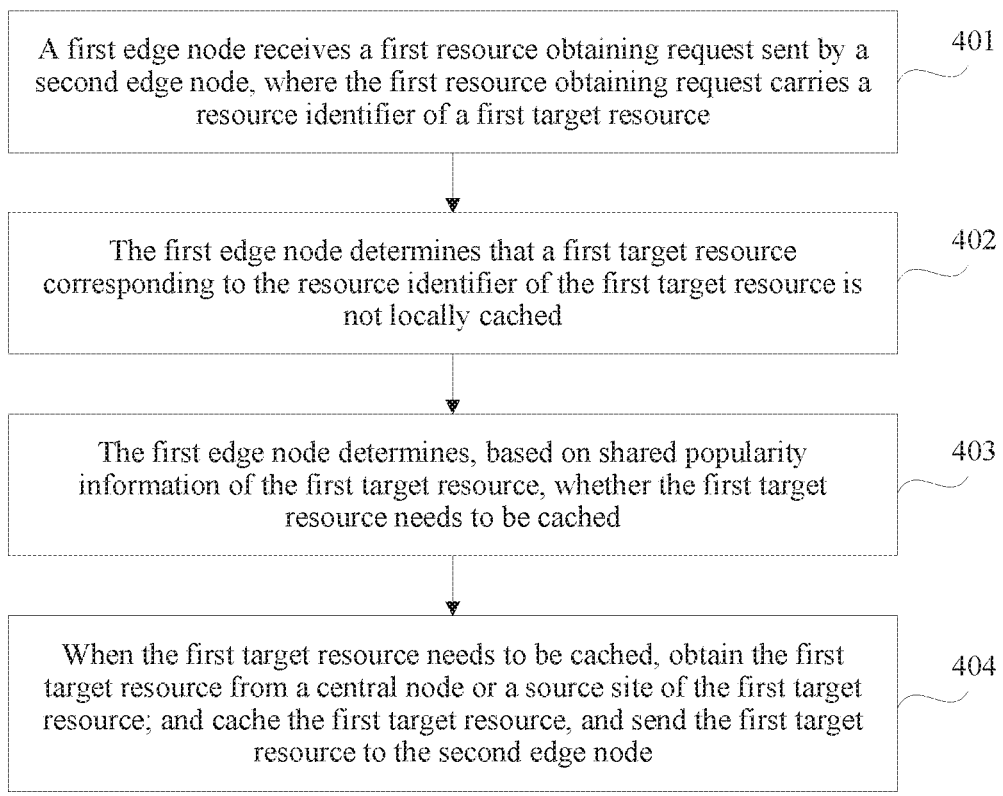
FIG. 4 is a flowchart of a first resource obtaining method according to an embodiment of the present disclosure.

After each of the plurality of edge nodes stores the hash table sent by the central node, any one of the plurality of edge nodes may receive a resource obtaining request sent by another edge node, and share a resource with the other edge node. An example in which the first edge node receives a resource obtaining request sent by the second edge node, and shares a resource with the second edge node is used for description. The first edge node is an edge node deployed on a first base station, the second edge node is an edge node deployed on a second base station, and the first base station and the second base station access an external network using a same gateway device. FIG. 4 shows a resource obtaining method according to an embodiment of the present disclosure. The method includes the following steps.

Step 401: The first edge node receives a first resource obtaining request sent by a second edge node, where the first resource obtaining request carries a resource identifier of a first target resource.

The first resource obtaining request is usually sent by the second edge node to the first edge node in a form of a data packet. Therefore, after receiving the first resource obtaining request sent by the second edge node, the first edge node may parse the data packet, to obtain the resource identifier of the first target resource that is carried in the first resource obtaining request.

It should be noted that for an operation of parsing the data packet by the first edge node, refer to a related technology. Details are not described in this embodiment of the present disclosure.

In addition, the resource identifier is used to uniquely identify the first target resource, and the resource identifier may be an address of the first target resource, a name of the first target resource, or the like.

It should be further noted that the second edge node may be any one of the plurality of edge nodes. In addition, the first resource obtaining request may be sent by a terminal in a network coverage area of the second base station to the second edge node. When the second edge node does not cache the first target resource, the second edge node sends the first resource obtaining request to the first edge node.

Step 402: The first edge node determines that a first target resource corresponding to the resource identifier of the first target resource is not locally cached.

For example, the first edge node may locally search for the corresponding first target resource based on the resource identifier of the first target resource, and when finding no first target resource, determine that the first target resource is not locally cached. When finding the first target resource, the first edge node determines that the first target resource is locally cached.

In a content delivery network (CDN) system according to other approaches, it is determined, based on access popularity information of a resource, whether the resource is cached. When the popularity information of the resource is greater than a threshold, the resource is cached. When the popularity information of the resource is less than or equal to the threshold, the resource is not cached. Therefore, that the first edge node determines that a first target resource corresponding to the resource identifier of the first target resource is not locally cached may comprise the following: the first edge node queries for shared popularity information of the first target resource based on the resource identifier of the first target resource; and the first edge node queries determines, based on the shared popularity information of the first target resource, whether the first target resource is locally cached.

Step 403: The first edge node determines, based on shared popularity information of the first target resource, whether the first target resource needs to be cached, where the shared popularity information of the first target resource is determined by a quantity of obtaining requests for the first target resource that are received by the first edge node from the first edge node and another edge node. The other edge node includes any edge node other than the first edge node deployed on a base station that accesses an external network using the gateway device.

For example, the first edge node may determine whether the shared popularity information of the first target resource meets a first cache condition, and when the shared popularity information of the first target resource meets the first cache condition, determine that the first target resource needs to be cached, or when the shared popularity information of the first target resource does not meet the first cache condition, determine that the first target resource does not need to be cached.

The shared popularity information of the first target resource is determined by the quantity of obtaining requests for the first target resource that are received by the first edge node from the first edge node and the other edge node. Therefore, the first cache condition varies with the shared popularity information of the first target resource. For example, when the shared popularity information of the first target resource includes a quantity of requests for a target resource, the first cache condition may be that the quantity of requests for the target resource is greater than or equal to a first preset quantity threshold. When the shared popularity information of the first target resource includes a request frequency determined based on the quantity of requests for the target resource, the first cache condition may be that the request frequency is greater than or equal to a preset frequency threshold. An operation of determining the request frequency based on the quantity of requests for the target resource may comprise: determining a quantity of requests for the first target resource within a preset time period; and obtaining the request frequency by dividing the quantity of requests for the target resource by duration of the preset time period.

It should be noted that the first preset quantity threshold may be preset. For example, the first preset quantity threshold may be 20, 25, or the like. The preset frequency threshold may also be preset. For example, the preset frequency threshold may be 5 times per hour, 10 times per hour, or the like. The preset time period may be preset. For example, the preset time period is a time period between a current time and T days before the current time. For another example, the preset time period may be a time period between a time at which the system shown in FIG. 1B goes online and a time at which the first resource obtaining request is currently received.

For step 402 and step 403, in a possible example, when a quantity of requests for a resource is greater than or equal to N, the edge node determines that the resource needs to be cached. For step 402 and step 403, in a possible implementation, step 402 and step 403 may be implemented using a same operation. For example, the first edge node obtains the shared popularity information of the first target resource based on the resource identifier of the first target resource, and determines whether the shared popularity information of the first target resource is N. Because the shared popularity information is N, it may be determined that the shared popularity information of the first target resource before the first edge node currently accesses the shared popularity information of the first target resource is N−1, which is less than N. Therefore, the first target resource is not locally cached. In addition, because the shared popularity information of the first target resource has reached N, it may be determined that the first target resource needs to be cached.

In addition, when the first target resource does not need to be cached, the first edge node may send first prompt information to the second edge node. The first prompt information is used to prompt the second edge node to obtain the first target resource from the central node or a source site of the first target resource. When the second edge node receives the first prompt information sent by the first edge node, the second edge node may send the first resource obtaining request to the central node or the source site of the first target resource. When receiving the first resource obtaining request sent by the second edge node, the central node or the source site of the first target resource may obtain the first target resource corresponding to the resource identifier of the first target resource, and send the first target resource to the second edge node. When receiving the first target resource sent by the central node or the source site of the first target resource, the second edge node may send the first target resource to a terminal that is currently in a network coverage area of the second base station and that is configured to send the first resource obtaining request.

It should be noted that, when the first target resource does not need to be cached, the first edge node instructs the second edge node to directly go back to the source site (request the first target resource from the central node or the source site of the first target resource). In this way, a delay increase caused by a case in which the first edge node goes back to the source site, and then returns the first target resource to the second edge node can be avoided.

Step 404: When the first target resource needs to be cached, obtain the first target resource from a central node deployed on the gateway device or a source site of the first target resource; and cache the first target resource, and send the first target resource to the second edge node.

For example, the first edge node may send the first resource obtaining request to the central node or the source site of the first target resource. When receiving the first resource obtaining request, the central node or the source site of the first target resource obtains the first target resource corresponding to the resource identifier of the first target resource, and sends the first target resource to the first edge node. The first edge node receives the first target resource sent by the central node or the source site of the first target resource, caches the first target resource, and sends the first target resource to the second edge node.

In this embodiment of the present disclosure, when the first edge node receives the first resource obtaining request sent by the second edge node, and the first target resource is not locally cached, the first edge node may determine, using the shared popularity information of the first target resource, whether the first target resource needs to be cached. The shared popularity information of the first target resource is determined by a quantity of times that all edge nodes deployed on the base station that accesses the external network using the gateway device access the first target resource, in other words, the first edge node may receive a request for obtaining the first target resource that is sent by any one of the plurality of edge nodes. Therefore, the shared popularity information of the first target resource in the first edge node is improved. In addition, it is determined, using the shared popularity information, whether the first target resource needs to be cached, to accelerate a speed of caching the first target resource by the first edge node.

The first edge node may share a resource with another edge node according to the method shown in FIG. 4. Certainly, the first edge node may also obtain a resource shared by the other edge node from another edge node. In this case, for an operation of obtaining the shared resource from the other edge node by the first edge node, refer to FIG. 5. An operation includes the following steps.

Step 501: The first edge node receives a second resource obtaining request sent by a terminal, where the second resource obtaining request carries a resource identifier of a second target resource.

The terminal is any terminal that is currently in a network coverage area of a first base station.

Step 502: The first edge node determines that a second target resource corresponding to the resource identifier of the second target resource is not locally cached.

For an operation of step 502, refer to the operation of step 402. Details are not described in this embodiment of the present disclosure again.

Step 503: The first edge node determines, based on the resource identifier of the second target resource and a stored hash table, an identifier of a shared processing node corresponding to the second target resource, for example, a node identifier of a third edge node, where the third edge node may be any one of the plurality of edge nodes.

For example, the first edge node: performs a hash operation on the resource identifier of the second target resource, to obtain a first hash value; determines, in hash values of node identifiers of the plurality of edge nodes, a second hash value having a shortest logical distance from the first hash value, obtains, from the hash table, a node identifier corresponding to the second hash value; and determines the obtained node identifier as the node identifier of the third edge node.

Because the hash values of the plurality of edge nodes may constitute a hash ring, the shortest logical distance is a shortest distance between hash values in the hash ring. For example, when determining, in the hash values of the node identifiers of the plurality of edge nodes, the second hash value having a shortest logical distance from the first hash value, the first edge node may determine a location of the first hash value in the hash ring. The location of the first hash value in the hash ring is used as a start point, and a hash value adjacent to the first hash value in a clockwise direction of the hash ring is determined as the second hash value having a shortest logical distance from the first hash value.

For example, the first edge node may perform a hash operation on the resource identifier ID 1 of the second target resource, to obtain a hash value akdsaf123ae2qfdwq corresponding to the resource identifier. When a hash value that has a shortest logical distance from the hash value corresponding to the resource identifier and that is determined in the hash values of the node identifiers of the plurality of edge nodes is Jkdsaf832e2qfdwq, a node identifier that is corresponding to the hash value having a shortest logical distance from the hash value corresponding to the resource identifier and that is obtained from the hash table shown in Table 1 based on the hash value having a shortest logical distance from the hash value corresponding to the resource identifier is 192.168.1.2, and the obtained node identifier is determined as a shared processing node identifier corresponding to the resource identifier, namely, the node identifier of the third edge node in this embodiment.

Step 504: The first edge node sends the second resource obtaining request to a third edge node corresponding to the node identifier of the third edge node.

Further, after the first edge node sends the second resource obtaining request to the third edge node corresponding to the node identifier of the third edge node, the third edge node may determine, when receiving the second resource obtaining request, that the second target resource is not locally cached, and that the second target resource does not need to be cached. Therefore, the third edge node may send second prompt information to the first edge node. The second prompt information is used to prompt the first edge node to obtain the second target resource from a central node or a source site of the second target resource. When receiving the second prompt information sent by the third edge node, the first edge node may send the second resource obtaining request to the central node or the source site of the second target resource. When receiving the second resource obtaining request, the central node or the source site of the second target resource may obtain the second target resource corresponding to the resource identifier of the second target resource, and send the second target resource to the first edge node. When receiving the second target resource sent by the central node or the source site of the second target resource, the first edge node sends the second target resource to a terminal that is currently in the network coverage area of the first base station and that is configured to send the second resource obtaining request.

In this embodiment of the present disclosure, when the first edge node receives the second resource obtaining request sent by the terminal, if the first edge node does not cache the second target resource, the first edge node may determine the node identifier of the third edge node based on the resource identifier of the second target resource and the stored hash table, and send the second resource obtaining request to the third edge node, to obtain the second target resource from the third edge node. Therefore, the first edge node does not need to send the second resource obtaining request to the central node or the source site of the second target resource using a gateway device, to reduce bandwidth consumption of an interface between a base station and the gateway device.

It should be noted that in this embodiment of the present disclosure, because any one of the plurality of edge nodes can not only share a resource with another edge node, but also obtain a resource that can be shared by the other edge node from the other edge node, the plurality of edge nodes may store popularity information of a resource that the terminal requests to obtain, and may further store shared popularity information of a resource that another edge node (including the edge node) requests to obtain. When the first edge node is an edge node that shares a resource with other edge nodes, and any one of the other edge nodes does not locally find a first target resource, the edge node may send a first resource obtaining request about the first target resource to the first edge node. Therefore, to accelerate a speed of caching the first target resource by the first edge node from the central node or a source site of the first target resource, after receiving the first resource obtaining request sent by the second edge node, the first edge node may further update shared popularity information of the first target resource. An operation is as follows.

The shared popularity information of the first target resource may be stored in a plurality of manners, and different storage manners are corresponding to different update manners. Therefore, the first edge node may also update the shared popularity information of the first target resource in a plurality of manners, and the following two manners are used as examples for description.

(1). When the shared popularity information of the first target resource and a resource identifier of the first target resource are stored in a form of a correspondence, if the first edge node receives the first resource obtaining request sent by the second edge node, the first edge node may determine, in a stored correspondence between a resource identifier and shared popularity information based on the resource identifier of the first target resource, the shared popularity information corresponding to the resource identifier of the first target resource, and update the shared popularity information corresponding to the resource identifier of the first target resource.

It should be noted that, because the shared popularity information of the first target resource is determined by a quantity of obtaining requests for the first target resource that are received by the first edge node from the first edge node and another edge node, the shared popularity information may include a quantity of requests for the first target resource and the like. When the shared popularity information includes the quantity of requests for the first target resource, an operation of updating the shared popularity information of the first target resource by the first edge node may be increasing the quantity of requests for the first target resource. The quantity of requests for the first target resource may be increased by 1 each time.

For example, when the shared popularity information includes the quantity of requests for the first target resource, and the correspondence between a resource identifier and shared popularity information is shown in Table 2, if the first edge node receives the first resource obtaining request sent by the second edge node, and the first resource obtaining request carries the resource identifier Content_signal_1 of the first target resource, the first edge node may determine, in the correspondence between a resource identifier and shared popularity information shown in Table 2 based on the resource identifier of the first target resource, that a current quantity of requests corresponding to the resource identifier is 9, and increase the quantity 9 of requests by 1, to complete updating of the shared popularity information of the first target resource.

TABLE 2

| Resource identifier | Shared popularity information |
|---|---|
| Content_sign_1 | 9 times |
| Content_sign_2 | 65 times |
| Content_sign_3 | 30 times |
| . . . | . . . |

It should be noted that in this embodiment of the present disclosure, the correspondence between a resource identifier and shared popularity information shown in Table 2 is merely used as an example for description, and does not constitute a limitation on this embodiment of the present disclosure.

(2). When the shared popularity information of the first target resource and the resource identifier of the first target resource are stored in a form of a cache queue, if the first edge node receives the first resource obtaining request sent by the second edge node, the first edge node may update, based on the resource identifier of the first target resource, corresponding shared popularity information in a shared cache queue, and then perform re-ranking in the shared cache queue, such that a resource identifier of a resource with highest popularity ranks first in the shared cache queue.

It should be noted that, because storage space of the shared cache queue is limited, when the storage space of the shared cache queue is full, the first edge node may further delete a resource identifier ranked last in the shared cache queue and corresponding shared popularity information.

In addition, the shared cache queue may be a shared cache queue based on any cache update algorithm. For example, the cache update algorithm may be a least frequently used (LFU) algorithm, a first in first out (FIFO) algorithm, or a least recently used (LRU) algorithm.

It should be noted that, when the shared popularity information of the first target resource and the resource identifier of the first target resource are stored in a form of a cache queue, the shared cache queue may further include a cache address link of a locally cached resource, and the cache address link may be a file path. Therefore, when locally searching for the corresponding first target resource, the first edge node may determine, based on the resource identifier of the first target resource, whether a cache address link corresponding to the resource identifier of the first target resource exists in the shared cache queue, and when the cache address link does not exist in the shared cache queue, determine that the first target resource is not locally cached. When the cache address link exists in the shared cache queue, the first edge node determines that the first target resource is locally cached.

In addition, when the cache address link exists in the shared cache queue, and the first edge node determines that the first target resource is locally cached, the first edge node may locally obtain the first target resource based on the cache address link, and send the first target resource to the second edge node. When receiving the first target resource, the second edge node may send the first target resource to the terminal.

Similarly, the first edge node may further receive the second resource obtaining request sent by the terminal, and store popularity information of a resource requested by the terminal. Therefore, a resource identifier and the popularity information of the resource that the terminal requests to obtain may also be stored in a form of a correspondence or a cache queue.

Generally, the edge node locally caches a specific resource only when popularity information of the resource meets a preset cache condition. Therefore, when the first edge node stores, in a form of a cache queue, the resource identifier and the popularity information of the resource that the terminal requests to obtain, and receives the second resource obtaining request sent by the terminal, the first edge node may record each received resource obtaining request sent by the terminal, such that the terminal can directly quickly obtain a requested resource from the first edge node subsequently. In other words, after receiving the second resource obtaining request sent by the terminal that is currently in the network coverage area of the first base station, the first edge node may update the popularity information of the second target resource in the first edge node.

For example, when receiving the second resource obtaining request sent by the terminal, the first edge node may update, based on the resource identifier of the second target resource, corresponding popularity information in a local cache queue, and then perform re-ranking in the local cache queue, such that a resource identifier of a resource with highest popularity ranks first in the local cache queue.

It should be noted that in this embodiment of the present disclosure, the local cache queue and the shared cache queue of the first edge node may include a same resource identifier. Generally, shared popularity information of the resource identifier of the resource that is recorded in the shared cache queue is certainly greater than popularity information of the resource identifier of the resource that is recorded in the local cache queue. Therefore, when the shared popularity information of the resource identifier of the resource that is recorded in the shared cache queue meets a first cache condition, the first edge node may cache the resource. When the popularity information of the resource identifier of the resource that is recorded in the local cache queue meets a cache condition, because the first edge node has cached the resource, to save storage space of the first edge node, the resource may not be cached, but a cache address link of the resource is stored in the local cache queue.

Figure 6A:
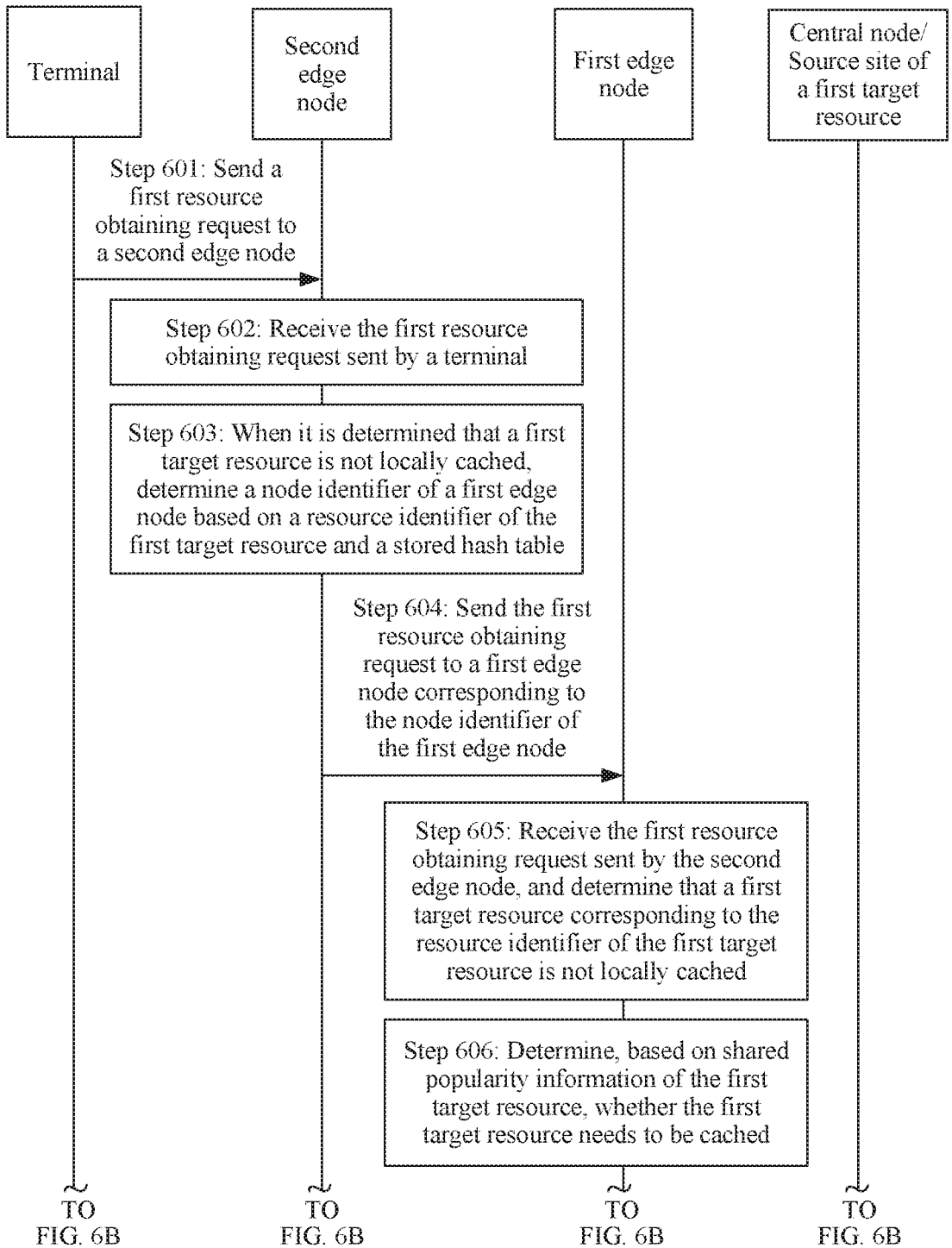
FIG. 6A and FIG. 6B are flowcharts of a third resource obtaining method according to an embodiment of the present disclosure.
Figure 6B:
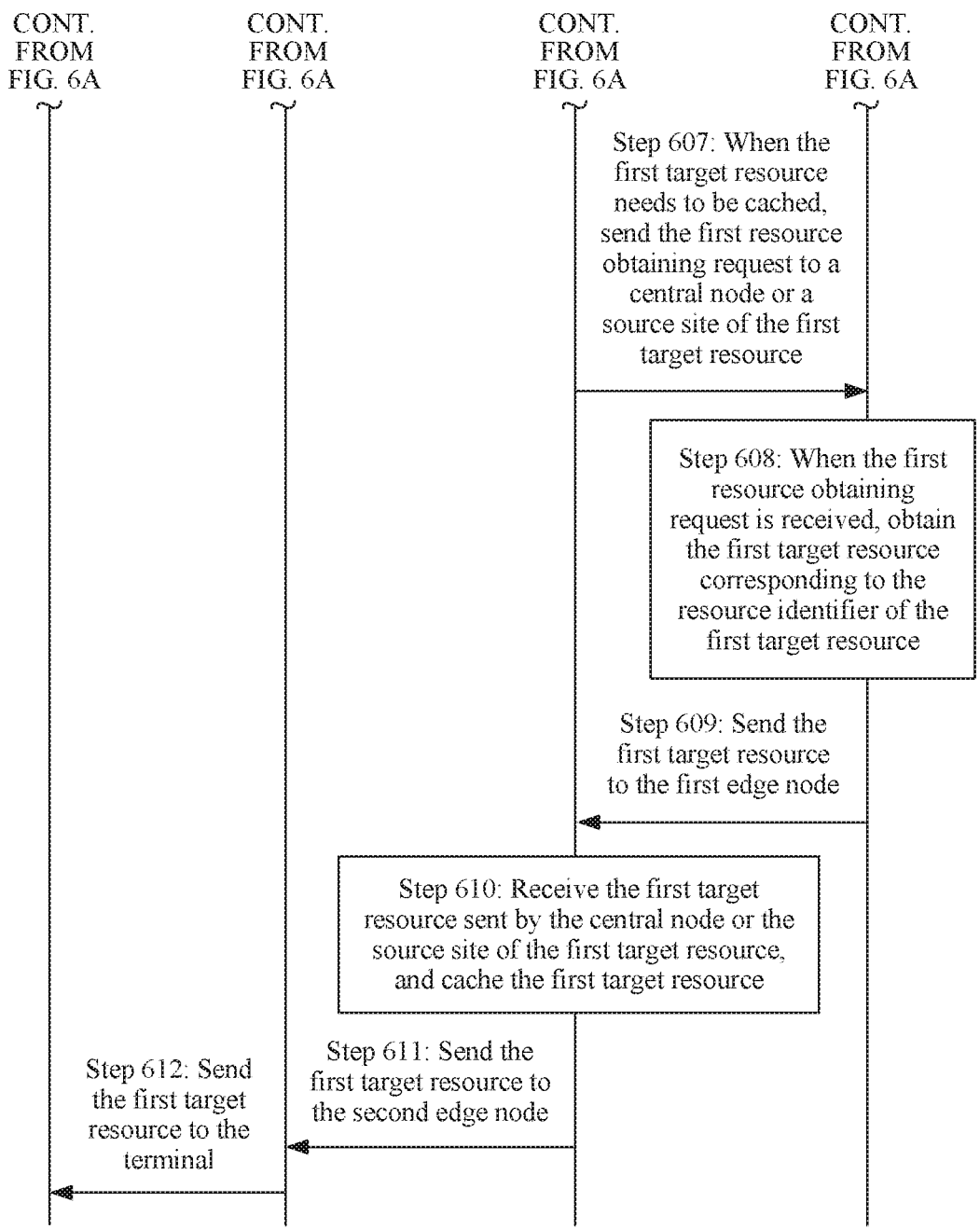

To further describe an implementation of this application, FIG. 6A and FIG. 6B are schematic diagrams of a resource obtaining method according to an embodiment of the present disclosure. Referring to FIG. 6A and FIG. 6B, the method includes the following steps.

Step 601: A terminal sends a first resource obtaining request to a second edge node.

The terminal is any terminal that is currently in a network coverage area of a second base station, the first resource obtaining request carries a resource identifier of a first target resource, and the second edge node is an edge node deployed on the second base station.

Step 602: The second edge node receives the first resource obtaining request sent by the terminal.

Step 603: When determining that a first target resource is not locally cached, the second edge node determines a node identifier of a first edge node based on a resource identifier of the first target resource and a stored hash table.

For example, the second edge node may perform a hash operation on the resource identifier of the first target resource, to obtain a hash value corresponding to the resource identifier, and determine, in hash values of node identifiers of the plurality of edge nodes, a hash value having a shortest logical distance from a hash value corresponding to the resource identifier. A node identifier corresponding to the hash value having a shortest logical distance from the hash value corresponding to the resource identifier is a shared processing node identifier corresponding to the resource identifier. For example, in this embodiment of the present disclosure, it is assumed that the shared processing node identifier corresponding to the resource identifier is the identifier of the first edge node. After determining the shared processing node identifier corresponding to the resource identifier, the second edge node may perform the following operation in step 604.

In addition, when the second edge node determines that the first target resource is locally cached, the second edge node may directly send the first target resource to the terminal.

It should be noted that for another operation related to step 602, refer to the operation in step 503. Details are not described in this embodiment of the present disclosure again.

Step 604: The second edge node sends the first resource obtaining request to a first edge node corresponding to the node identifier of the first edge node.

Step 605: The first edge node receives the first resource obtaining request sent by the second edge node, and determines that a first target resource corresponding to the resource identifier of the first target resource is not locally cached.

It should be noted that for an operation of step 605, refer to the operation of step 402. Details are not described in this embodiment of the present disclosure again.

Step 606: The first edge node determines, based on shared popularity information of the first target resource, whether the first target resource needs to be cached.

It should be noted that for an operation of step 606, refer to the operation of step 403. Details are not described in this embodiment of the present disclosure again.

Step 607: When the first target resource needs to be cached, the first edge node sends the first resource obtaining request to a central node deployed on the gateway device or a source site of the first target resource.

It should be noted that for an operation of step 607, refer to the operation of step 404. Details are not described in this embodiment of the present disclosure again.

Step 608: When receiving the first resource obtaining request, the central node or the source site of the first target resource obtains the first target resource corresponding to the resource identifier of the first target resource.

It should be noted that, after the first edge node sends the first resource obtaining request to the central node, if the central node cannot obtain the first target resource, the central node may still send the first resource obtaining request to the source site of the first target resource. When receiving the first resource obtaining request, the source site of the first target resource obtains the first target resource corresponding to the resource identifier of the first target resource.

Step 609: The central node or the source site of the first target resource sends the first target resource to the first edge node.

Step 610: The first edge node receives the first target resource sent by the central node or the source site of the first target resource, and caches the first target resource.

Step 611: The first edge node sends the first target resource to the second edge node.

Step 612: The second edge node receives the first target resource sent by the first edge node, and sends the first target resource to the terminal.

When receiving the first target resource, the second edge node may send the first target resource to a terminal that is currently in the network coverage area of the second base station and that is configured to send the first resource obtaining request, and directly cache the first target resource.

In this embodiment of the present disclosure, when the second edge node receives the first resource obtaining request sent by the terminal, if the second edge node does not cache the first target resource, the second edge node may determine the node identifier of the first edge node based on the resource identifier of the first target resource and the stored hash table, and send the first resource obtaining request to the first edge node, to obtain the first target resource from the first edge node. Therefore, the second edge node does not need to send the first resource obtaining request to the central node or the source site of the first target resource using the gateway device, to reduce bandwidth consumption of an interface between the base station and the gateway device. In addition, when the first edge node receives the first resource obtaining request sent by the second edge node, and the first target resource is not locally cached, the first edge node may determine, using the shared popularity information of the first target resource, whether the first target resource needs to be cached. The shared popularity information of the first target resource is determined by a quantity of obtaining requests for the first target resource that are received by the first edge node from the first edge node and another edge node, in other words, the first edge node may receive a request for obtaining the first target resource that is sent by any one of the plurality of edge nodes. Therefore, popularity of the first target resource in the first edge node is improved. In addition, it is determined, using the shared popularity information, whether the first target resource needs to be cached, to accelerate a speed of caching the first target resource by the first edge node.

Figure 7A:
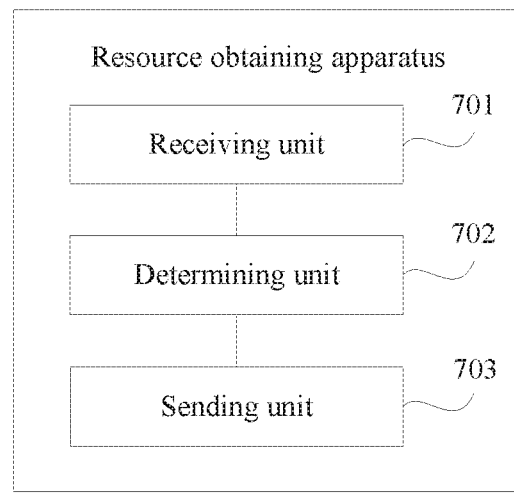
FIG. 7A is a schematic structural diagram of a first resource obtaining apparatus according to an embodiment of the present disclosure.

FIG. 7A is a schematic structural diagram of a resource obtaining apparatus according to an embodiment of the present disclosure that belongs to a same inventive concept as the foregoing method embodiments. Referring to FIG. 7A, the resource obtaining apparatus is configured to implement functions of the resource obtaining method in the foregoing method embodiments shown in FIG. 4 and FIG. 5, and includes a receiving unit 701, a determining unit 702, and a sending unit 703.

The receiving unit 701 is configured to perform an operation in step 401 in the foregoing embodiment in FIG. 4.

The determining unit 702 is configured to perform an operation in step 402 in the foregoing embodiment in FIG. 4.

The determining unit 702 is further configured to perform an operation in step 403 in the foregoing embodiment in FIG. 4.

The sending unit 703 is configured to perform an operation in step 404 in the foregoing embodiment in FIG. 4.

Optionally, the sending unit 703 is further configured such that when the first target resource does not need to be cached, the sending unit 703 sends first prompt information to the second edge node, where the first prompt information is used to prompt the second edge node to obtain the first target resource from the central node or the source site of the first target resource.

Figure 7B:
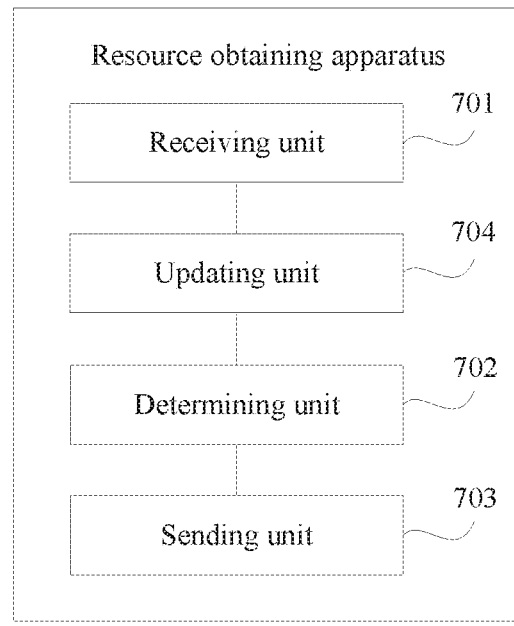
FIG. 7B is a schematic structural diagram of a second resource obtaining apparatus according to an embodiment of the present disclosure.

Optionally, referring to FIG. 7B, the apparatus further includes an updating unit 704 configured to update the shared popularity information of the first target resource.

Figure 5:
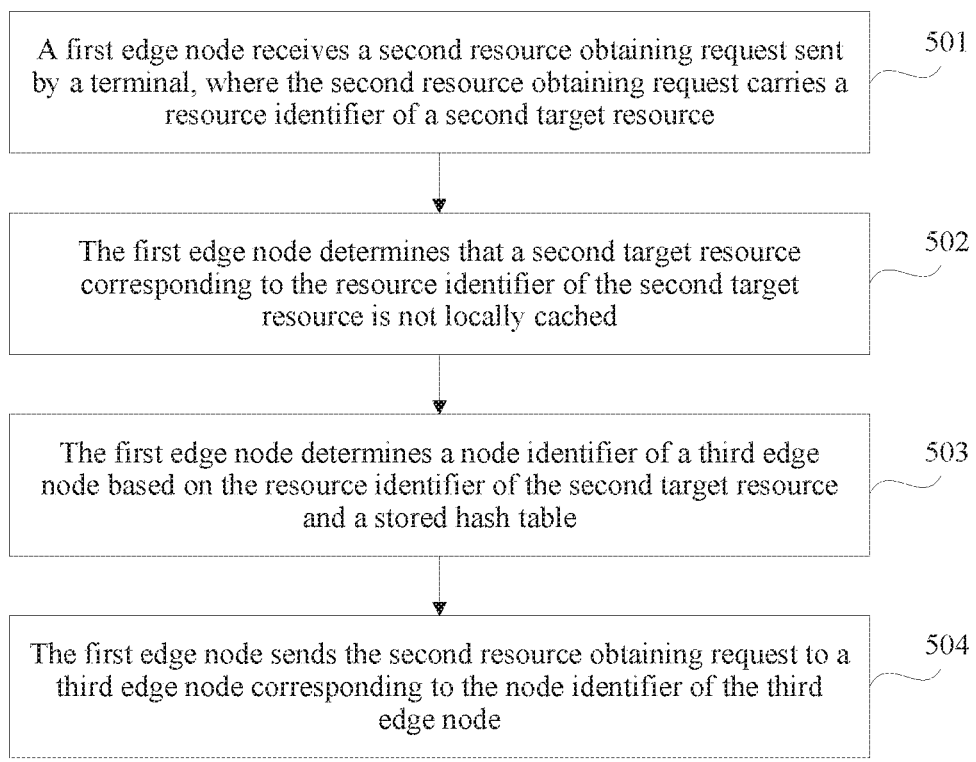
FIG. 5 is a flowchart of a second resource obtaining method according to an embodiment of the present disclosure.

Optionally, the receiving unit 701 is further configured to perform an operation in step 501 in the foregoing embodiment in FIG. 5; the determining unit 702 is further configured to perform operations in step 502 and step 503 in the foregoing embodiment in FIG. 5; and the sending unit 703 is further configured to perform an operation in step 504 in the foregoing embodiment in FIG. 5.

Optionally, the determining unit 702 is further configured to determine a node identifier of a third edge node based on the resource identifier of the second target resource and a stored hash table by: performing a hash operation on the resource identifier of the second target resource, to obtain a first hash value; determining, in hash values of node identifiers of the plurality of edge nodes, a second hash value having a shortest logical distance from the first hash value; obtaining, from the hash table, a node identifier corresponding to the second hash value; and determining the obtained node identifier as the node identifier of the third edge node.

Optionally, the receiving unit 701 is further configured to receive the hash table delivered by the central node deployed on the gateway device.

Optionally, the sending unit 703 is further configured such that when second prompt information sent by the third edge node is received, the sending unit 703 sends the second resource obtaining request to the central node or a source site of the second target resource, where the second prompt information is used to prompt the first edge node to obtain the second target resource from the central node or the source site of the second target resource. The receiving unit 701 is further configured to receive the second target resource sent by the central node or the source site of the second target resource, and the sending unit 703 sends the second target resource to the terminal.

In this embodiment of the present disclosure, when the second edge node receives the first resource obtaining request sent by the terminal, if the second edge node does not cache the first target resource, the second edge node may determine the node identifier of the first edge node based on the resource identifier of the first target resource and the stored hash table, and send the first resource obtaining request to the first edge node, to obtain the first target resource from the first edge node. Therefore, the second edge node does not need to send the first resource obtaining request to the central node or the source site of the first target resource using the gateway device, to reduce bandwidth consumption of an interface between the base station and the gateway device. In addition, when the first edge node receives the first resource obtaining request sent by the second edge node, and the first target resource is not locally cached, the first edge node may determine, using the shared popularity information of the first target resource, whether the first target resource needs to be cached. The shared popularity information of the first target resource is determined by a quantity of obtaining requests for the first target resource that are received by the first edge node from the first edge node and another edge node, in other words, the first edge node may receive a request for obtaining the first target resource that is sent by any one of the plurality of edge nodes. Therefore, popularity of the first target resource in the first edge node is improved. In addition, it is determined, using the shared popularity information, whether the first target resource needs to be cached, to accelerate a speed of caching the first target resource by the first edge node.

In this embodiment of the present disclosure, the resource obtaining apparatus is represented in a form of a function unit. The "unit" herein may be an application-specific integrated circuit (ASIC), a circuit, a processor and a memory that execute one or more software or firmware programs, an integrated logic circuit, and/or another device that can provide the foregoing functions. In a simple embodiment, a person skilled in the art may figure out that the resource obtaining apparatus may be in a form shown in FIG. 2. The receiving unit 701, the determining unit 702, the sending unit 703, and the updating unit 704 may be implemented by the processor and the memory in FIG. 2. For example, the receiving unit 701 and the updating unit 704 may be implemented by executing the shared processing node determining module 2081 by the processor, and the determining unit 702 and the sending unit 703 may be implemented by executing the shared processing module 2082 by the processor.

Figure 8:
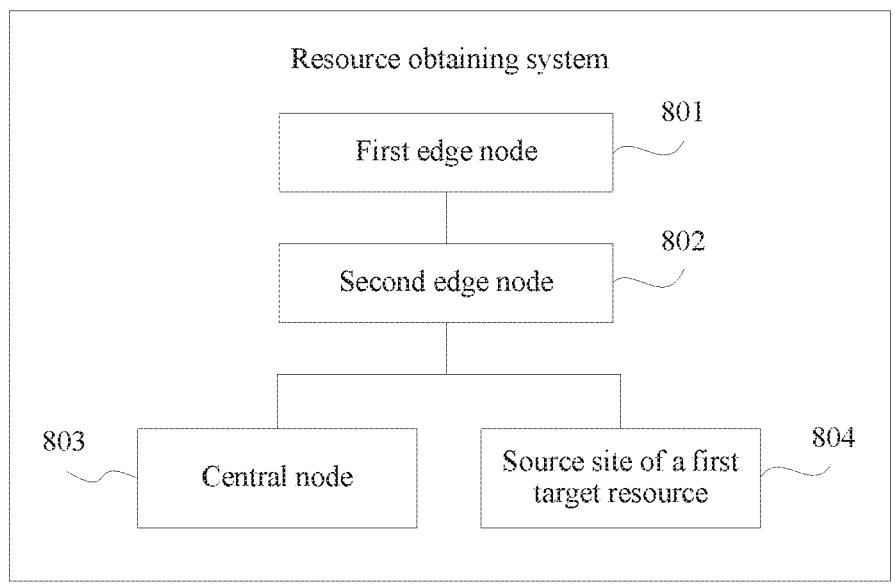
FIG. 8 is a schematic structural diagram of a resource obtaining system according to an embodiment of the present disclosure.

FIG. 8 is a schematic structural diagram of a resource obtaining system according to an embodiment of the present disclosure that belongs to a same inventive concept as the foregoing method embodiments. Referring to FIG. 8, the structure of the resource obtaining system is configured to implement functions of the resource obtaining method in the foregoing method embodiment shown in FIG. 6A and FIG. 6B, and includes a first edge node 801, a second edge node 802, and a central node 803 or a source site 804 of a first target resource.

The second edge node 802 is configured to perform step 601 in the foregoing embodiment in FIG. 6A and FIG. 6B.

The second edge node 802 is further configured to perform step 602 in the foregoing embodiment in FIG. 6A and FIG. 6B.

The first edge node 801 is configured to perform step 603 in the foregoing embodiment in FIG. 6A and FIG. 6B.

The first edge node 801 is further configured to perform step 604 in the foregoing embodiment in FIG. 6A and FIG. 6B.

The first edge node 801 is further configured to perform step 605 in the foregoing embodiment in FIG. 6A and FIG. 6B.

The central node 803 or the source site 804 of the first target resource is configured to perform step 606 in the foregoing embodiment in FIG. 6A and FIG. 6B.

The first edge node 801 is further configured to perform step 607 in the foregoing embodiment in FIG. 6A and FIG. 6B.

The second edge node 802 is further configured to perform step 608 in the foregoing embodiment in FIG. 6A and FIG. 6B.

Optionally, the central node 803 is further configured to implement a function of a hash table determining method in the foregoing method embodiment shown in FIG. 3 by: performing a hash operation on node identifiers of the plurality of edge nodes, to obtain a hash value of a node identifier of each edge node; and establishing a mapping relationship between each of the node identifiers of the plurality of edge nodes and each of the corresponding hash values, to obtain the hash table, and sending the hash table to the plurality of edge nodes.

In conclusion, in this embodiment of the present disclosure, when the second edge node receives the first resource obtaining request sent by the terminal, if the second edge node does not cache the first target resource, the second edge node may determine the node identifier of the first edge node based on the resource identifier of the first target resource and the stored hash table, and send the first resource obtaining request to the first edge node, to obtain the first target resource from the first edge node. Therefore, the second edge node does not need to send the first resource obtaining request to the central node or the source site of the first target resource using the gateway device, to reduce bandwidth consumption of an interface between the base station and the gateway device. In addition, when the first edge node receives the first resource obtaining request sent by the second edge node, and the first target resource is not locally cached, the first edge node may determine, using the shared popularity information of the first target resource, whether the first target resource needs to be cached. The shared popularity information of the first target resource is determined by a quantity of obtaining requests for the first target resource that are received by the first edge node from the first edge node and another edge node, in other words, the first edge node may receive a request for obtaining the first target resource that is sent by any one of the plurality of edge nodes. Therefore, popularity of the first target resource in the first edge node is improved. In addition, it is determined, using the shared popularity information, whether the first target resource needs to be cached, to accelerate a speed of caching the first target resource by the first edge node.

An embodiment of the present disclosure further provides a computer storage medium, configured to store a computer software instruction for implementing the resource obtaining apparatus shown in FIG. 7A. The computer software instruction includes a program designed for performing the foregoing method embodiments. Service data required for developing an application can be obtained by executing the stored program.

It should be noted that, for brief description, the foregoing method embodiments are represented as a series of actions. However, a person skilled in the art should appreciate that this application is not limited to the described order of the actions, because according to this application, some steps may be performed in other orders or simultaneously. Moreover, it should be further appreciated by a person skilled in the art that actions and modules in the embodiments described in this specification are not necessarily required by this application.

Although this application is described with reference to the embodiments, in a process of implementing this application that claims protection, a person skilled in the art may understand and implement another variation of the disclosed embodiments by viewing the accompanying drawings, disclosed content, and the accompanying claims. In the claims, "comprising" does not exclude another component or another step, and "a" or "one" does not exclude a case of "a plurality of". A single processor or another unit may implement several functions enumerated in the claims. Some measures are recorded in dependent claims that are different from each other, but this does not mean that these measures cannot be combined to produce a better effect.

A person skilled in the art should understand that the embodiments of this application may be provided as a method, an apparatus (device), or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code. The computer program is stored/distributed in a proper medium and is provided as or used as a part of the hardware together with other hardware, or may also use another distribution form, such as using the Internet or another wired or wireless telecommunications system.

This application is described with reference to the flowcharts and/or block diagrams of the method, the apparatus (device), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, such that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, such that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, such that a series of operations and steps are performed on the computer or the other programmable device, thereby generating computer-implemented processing. Therefore, the instructions executed on the computer or the other programmable device provide steps for implementing a specific function in one or more processes in the flowcharts and/or in one or more blocks in the block diagrams.

Although this application is described with reference to features and the embodiments thereof, various modifications and combinations may be made to them without departing from the scope of this application. Correspondingly, the specification and accompanying drawings are merely example description of this application defined by the accompanying claims, and is considered as any of or all modifications, variations, combinations or equivalents that cover the scope of this application. A person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A resource obtaining method in which a first base station and a second base station access an external network using a gateway device, wherein a first edge node is deployed on the first base station and a second edge node is deployed on the second base station, the method comprising:
receiving, by the first edge node, a first resource obtaining request from the second edge node, wherein the first resource obtaining request carries a resource identifier of a first target resource;
determining, by the first edge node, that a first target resource corresponding to the resource identifier of the first target resource is not locally cached;
determining, by the first edge node based on shared popularity information of the first target resource, whether the first target resource needs to be cached, wherein the shared popularity information of the first target resource is determined by a quantity of obtaining requests for the first target resource that are received by the first edge node from another edge node, and wherein the other edge node comprises any edge node other than an edge node deployed on a base station that accesses the external network using the gateway device;
obtaining, by the first edge node when the first target resource needs to be cached, the first target resource from a central node deployed on the gateway device or a source site of the first target resource;
caching, by the first edge node, the first target resource; and
sending the first target resource to the second edge node.

2. The method according to claim 1, further comprising sending, by the first edge node, first prompt information to the second edge node when the first target resource does not need to be cached.

3. The method according to claim 2, wherein the first prompt information prompts the second edge node to obtain the first target resource from the central node or the source site of the first target resource.

4. The method according to claim 1, wherein after receiving, by the first edge node, the first resource obtaining request from the second edge node, the method further comprises updating, by the first edge node, the shared popularity information of the first target resource.

5. The method according to claim 1, further comprising:
receiving, by the first edge node, a second resource obtaining request from a terminal, wherein the second resource obtaining request carries a resource identifier of a second target resource; and
determining, by the first edge node, that a second target resource corresponding to the resource identifier of the second target resource is not locally cached.

6. The method according to claim 5, further comprising:
determining, by the first edge node, a node identifier of a third edge node based on the resource identifier of the second target resource and a stored hash table, wherein the stored hash table comprises a mapping relationship between a node identifier of the edge node and a corresponding hash value; and
sending, by the first edge node, the second resource obtaining request to a third edge node corresponding to the node identifier of the third edge node.

7. The method according to claim 6, wherein determining, by the first edge node, the node identifier of the third edge node comprises:
performing, by the first edge node, a hash operation on the resource identifier of the second target resource, to obtain a first hash value;
determining, by the first edge node based on hash values corresponding to node identifiers of edge nodes deployed on the base station, a second hash value having a shortest logical distance from the first hash value;
obtaining, by the first edge node from the stored hash table, a node identifier corresponding to the second hash value; and
determining that the node identifier identifies the third edge node.

8. The method according to claim 6, wherein before determining, by the first edge node, the node identifier of the third edge node, the method further comprises receiving, by the first edge node, the stored hash table from the central node.

9. The method according to claim 5, wherein after sending, by the first edge node, the second resource obtaining request to the third edge node, the method further comprises:
sending, by the first edge node, the second resource obtaining request to the central node or a source site of the second target resource when receiving second prompt information from the third edge node, wherein the second prompt information prompts the first edge node to obtain the second target resource from the central node or the source site of the second target resource;
receiving, by the first edge node, the second target resource from the central node or the source site of the second target resource; and
sending the second target resource to the terminal.

10. A resource obtaining method in which a first base station and a second base station access an external network using a gateway device, wherein a first edge node is deployed on the first base station and a second edge node is deployed on the second base station, the method comprising:
receiving, by the second edge node, a first resource obtaining request from a terminal, wherein the first resource obtaining request carries a resource identifier of a first target resource;
determining, by the second edge node, that the first target resource is not locally cached;
determining a node identifier of the first edge node based on the resource identifier of the first target resource and a stored hash table, wherein the stored hash table comprises a mapping relationship between the node identifier and a corresponding hash value;
sending the first resource obtaining request to a first edge node;
receiving, by the first edge node, the first resource obtaining request from the second edge node;
determining that a first target resource corresponding to the resource identifier of the first target resource is not locally cached;
determining, by the first edge node based on shared popularity information of the first target resource, whether the first target resource needs to be cached, wherein the shared popularity information of the first target resource is determined by a quantity of obtaining requests for the first target resource that are received by the first edge node from another edge node, and wherein the other edge node comprises any edge node other than the edge node;
sending, by the first edge node, the first resource obtaining request to a central node deployed on the gateway device or a source site of the first target resource when the first edge node needs to cache the first target resource;
receiving, by the central node or the source site of the first target resource, the first resource obtaining request;
obtaining the first target resource corresponding to the resource identifier of the first target resource;
sending the first target resource to the first edge node;
receiving, by the first edge node, the first target resource from the central node or the source site of the first target resource;
caching the first target resource;
sending the first target resource to the second edge node;
receiving, by the second edge node, the first target resource from the first edge node; and
sending the first target resource to the terminal.

11. The method according to claim 10, before determining the node identifier of the first edge node, the method further comprises performing, by the central node, a hash operation on node identifiers of edge nodes deployed on the base station, to obtain a hash value of a node identifier of each edge node.

12. The method according to claim 11, further comprising:
establishing, by the central node, a mapping relationship between a node identifier of the edge node and a corresponding hash value, to obtain the hash table; and
sending the hash table to the edge node.

13. A resource obtaining system, comprising:
a second edge node deployed on a second base station that accesses an external network using a gateway device, wherein the second edge node is configured to:
receive a first resource obtaining request from a terminal, wherein the first resource obtaining request carries a resource identifier of a first target resource;
determine that the first target resource is not locally cached;
determine a node identifier of a first edge node based on the resource identifier of the first target resource and a stored hash table, wherein the stored hash table comprises a mapping relationship between the node identifier and a corresponding hash value; and
send the first resource obtaining request to the first edge node;
the first edge node deployed on a first base station that accesses the external network using the gateway device, wherein the first edge node is configured to:
receive the first resource obtaining request from the second edge node;
determine that a first target resource corresponding to the resource identifier of the first target resource is not locally cached;
determine, based on shared popularity information of the first target resource, whether the first target resource needs to be cached, wherein the shared popularity information of the first target resource is determined by a quantity of obtaining requests for the first target resource that are received by the first edge node from another edge node, and wherein the other edge node comprises any edge node other than an edge node deployed on the base station that accesses the external network using the same gateway device; and
send the first resource obtaining request when the first target resource needs to be cached; and
a central node or a source site of the first target resource configured to:
receive the first resource obtaining request from the first edge node;
obtain the first target resource corresponding to the resource identifier of the first target resource; and
send the first target resource to the first edge node,
wherein the first edge node is further configured to:
receive the first target resource from the central node or the source site of the first target resource;
cache the first target resource; and
send the first target resource to the second edge node, and
wherein the second edge node is further configured to:
receive the first target resource from the first edge node; and
send the first target resource to the terminal.

14. The system according to claim 13, wherein the central node is further configured to perform a hash operation on node identifiers of edge nodes deployed on the base station to obtain a hash value of a node identifier of each edge node.

15. The system according to claim 14, wherein the central node is further configured to:
establish a mapping relationship between a node identifier of the node deployed on the base station and a corresponding hash value to obtain the hash table; and
send the hash table to the edge node.

16. The system according to claim 13, wherein the first edge node is further configured to send first prompt information to the second edge node when the first target resource does not need to be cached.

17. The system according to claim 16, wherein the first prompt information prompts the second edge node to obtain the first target resource from the central node or the source site of the first target resource.

18. The system according to claim 16, wherein the first edge node is further configured to update the shared popularity information of the first target resource after receiving the first resource obtaining request.

* * * * *